(12) United States Patent
Effertz et al.

(10) Patent No.: US 12,122,125 B2
(45) Date of Patent: Oct. 22, 2024

(54) LAMINATED GLASS PANE COMPRISING AN ELECTRONIC FUNCTIONAL MODULE

(71) Applicant: SAINT-GOBAIN GLASS FRANCE, Courbevoie (FR)

(72) Inventors: Christian Effertz, Aachen (DE); Clément Bottois, Aachen (DE); Patrick Weber, Alsdorf (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 449 days.

(21) Appl. No.: 17/617,485

(22) PCT Filed: May 29, 2020

(86) PCT No.: PCT/EP2020/064958
§ 371 (c)(1),
(2) Date: Dec. 8, 2021

(87) PCT Pub. No.: WO2021/037404
PCT Pub. Date: Mar. 4, 2021

(65) Prior Publication Data
US 2022/0234333 A1    Jul. 28, 2022

(30) Foreign Application Priority Data
Aug. 26, 2019   (EP) .................................... 19193533

(51) Int. Cl.
*B32B 15/04* (2006.01)
*B32B 3/26* (2006.01)
(Continued)

(52) U.S. Cl.
CPC ........ *B32B 17/10165* (2013.01); *B32B 3/266* (2013.01); *B32B 17/10807* (2013.01); *B32B 2307/732* (2013.01); *B32B 2605/006* (2013.01)

(58) Field of Classification Search
CPC ........................................................ B32B 3/266
(Continued)

(56) References Cited

U.S. PATENT DOCUMENTS 10,933,611 B2 *   3/2021   Kizmaz ..................... B32B 7/12
11,407,204 B2 *   8/2022   Bauerle ................... B32B 27/30
(Continued)

FOREIGN PATENT DOCUMENTS

CN        101087135 A      12/2007
CN        106463813 A       2/2017
(Continued)

OTHER PUBLICATIONS

International Search Report as issued in International Patent Application No. PCT/EP2020/064958, dated Jul. 24, 2020.

*Primary Examiner* — Lauren R Colgan
(74) *Attorney, Agent, or Firm* — Pillsbury Winthrop Shaw Pittman LLP

(57) ABSTRACT

A laminated glass pane includes two glass or polymer panes and at least one connecting polymer film or connecting laminate adhesively bonded therebetween, wherein a cut-out in the connecting polymer film or in the connecting laminate is provided in a partial surface area of the laminated glass pane, and an electronic functional module that has a thickness smaller than the thickness of the connecting polymer film or the connecting laminate is accommodated in the cut-out, wherein the functional module has an electronic functional element that is fixed on a separate thin carrier polymer film on one of the glass or polymer panes, wherein an antenna and/or conductor structure that has a spiral or polygonal-spiral conductor path that surrounds the functional element is printed onto the carrier polymer film.

20 Claims, 3 Drawing Sheets

Figure 1A:
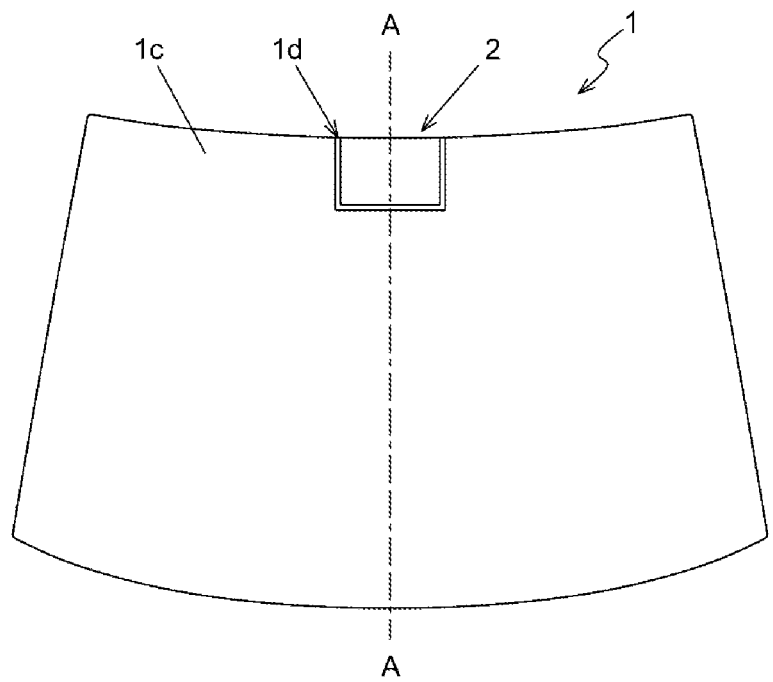

(51) Int. Cl.
*B32B 17/06* (2006.01)
*B32B 17/10* (2006.01)

(58) Field of Classification Search
USPC .......................................................... 428/428
See application file for complete search history.

(56) References Cited

U.S. PATENT DOCUMENTS

| | | | |
|---|---|---|---|
| 11,541,650 B2* | 1/2023 | Mannheim Astete | ........................ B32B 17/10761 |
| 2017/0327031 A1* | 11/2017 | Bauerle | ..................... B60Q 3/78 |
| 2019/0134954 A1* | 5/2019 | Bauerle | ............. B32B 17/10541 |
| 2019/0299852 A1* | 10/2019 | Bauerle | ............. B32B 17/10036 |
| 2020/0369007 A1* | 11/2020 | Bauerle | ................... B32B 37/12 |

FOREIGN PATENT DOCUMENTS

| | | |
|---|---|---|
| CN | 107111141 A | 8/2017 |
| CN | 108367545 A | 8/2018 |
| CN | 109073928 A | 12/2018 |
| DE | 10 2004 054465 A1 | 5/2006 |
| DE | 10 2005 006862 A1 | 8/2006 |
| DE | 10 2013 003686 A1 | 9/2014 |
| DE | 20 2015 009229 U1 | 12/2016 |
| EP | 2 121 308 B1 | 2/2016 |
| WO | WO 2012/031647 A1 | 3/2012 |
| WO | WO 2015/162107 A1 | 10/2015 |
| WO | WO 2016/162251 A1 | 10/2016 |
| WO | WO 2017/103426 A1 | 6/2017 |
| WO | WO 2019/057574 A1 | 3/2019 |
| WO | WO 2019/150037 A1 | 8/2019 |
| WO | WO 2019/150038 A1 | 8/2019 |
| WO | WO 2020/064297 A1 | 4/2020 |

\* cited by examiner

LAMINATED GLASS PANE COMPRISING AN ELECTRONIC FUNCTIONAL MODULE

CROSS-REFERENCE TO RELATED APPLICATIONS

This application is the U.S. National Stage of PCT/EP2020/064958, filed May 29, 2020, which in turn claims priority to European patent application number 19193533.7 filed Aug. 26, 2019. The content of these applications are incorporated herein by reference in their entireties.

The invention relates to a laminated glass pane with an electronic functional module, a vehicle equipped therewith, and a method for its production.

In motor vehicles and in buildings, the detection of conditions or parameters of the environment plays an increasingly important role for safe and efficient operation. Modern passenger cars as well as high quality buildings are, consequently, equipped with a large number of sensors that detect relevant environmental conditions or parameters and deliver the current values to processing and control units that control functions of the vehicle or building. This applies not only to motor vehicles but also, to a certain extent, to certain watercraft, rail vehicles, and aircraft.

Certain sensors can advantageously be accommodated on or in the windshield or, optionally, also the rear window, the side windows, or a glass roof unit of a passenger car. Such arrangements have long been known for so-called "rain sensors", via which the window wiper functions of the vehicle are controlled. Within the context of the general trend toward largely complete prefabrication of vehicle components, there are developments aimed at integration of such sensors into a prefabricated glazing unit (such as a windshield or rear window) of a vehicle. Corresponding solutions are mentioned in WO2019057574.

Vehicle windows with integrated or partially integrated sensors are also known from EP 2 121 308 B1 or CN 101 087 135 A. Known from DE 10 2004 054 465 A1 is an optical moisture sensor for detection of moisture on the outside and/or the inside of a motor vehicle window, which is integrated into the PVB film with which the two panes of the laminated glass pane are joined to one another. Furthermore, known from WO 2015/162107 A1 is a glass panel with an illuminated switching surface and heating function.

WO2019150037A1 discloses an OLED functional module on a printed circuit board within a laminated pane that is attached to one of the glass panes via a plastic strip. Similarly, WO2017103426A1 discloses an OLED functional module on a printed circuit board within a laminated pane.

DE202015009229 U1 and DE102013003686A1 disclose LED functional elements on printed circuit boards within a laminated pane. WO2017097536A1 discloses photodiodes on a printed circuit board within a laminated pane.

DE102005006862A1 discloses a capacitive rain sensor for vehicles that is constructed from spiral-like conductor structures. WO2020064297A1 also discloses a functional module within a laminated pane.

The electronic functional elements are typically arranged within a cut-out in a connecting film of the laminated pane in order to compensate for the thickness of the functional element in the surrounding areas.

It has also been found that the inevitable flow of the connecting polymer film or the connecting laminate between the two panes of the laminated glass pane can exert mechanical influences on an electronic functional element arranged between the panes, resulting in degradation of its ability to perform and/or its reliability. This problem occurs in particular when the actual functional element is surrounded by thin, closely adjacent conductor structures that are particularly sensitive.

The object of the invention is, consequently, to specify an improved laminated glass pane as well as an improved method for its production that are suitable for ensuring unrestricted performance and reliability of the embedded electronic functional module even after going through the necessary lamination process.

This object is accomplished in its device aspect by a laminated glass pane with the features of claim 1 and in its method aspect by a method with the features of claim 12. Expedient further developments of the concept of the invention constitute the subject matter of the respective dependent claims.

The invention includes the idea of mechanically decoupling, to the greatest extent possible, the electronic functional module, which is to be integrated into the laminated glass pane and which includes at least one electronic functional element, from the intermediate layer (connecting polymer film or connecting laminate) joining the first and second glass or polymer pane. This idea is taken further to the effect that this mechanical decoupling is most easily achieved by a geometric separation, i.e., the creation of a distance between the functional module and the intermediate layer.

It further includes the idea of providing, for this purpose, in a partial surface area of the laminated glass pane, a cut-out of the polymer film or the film laminate, which cut-out corresponds to or exceeds the lateral dimensions of the functional module. In addition, it is necessary for the functional module to be produced with a thickness that is at most equal to the thickness of the polymer film or of the film laminate, such that the in-line process can run with the polymer films or film laminates customarily used therein.

Finally, it is proposed to fix functional element of the electronic functional module on a separate thin carrier polymer film, in particular with a thickness in the range between 30 and 70 µm, on one of the glass or polymer panes.

The laminated glass pane according to the invention has two glass or polymer panes and at least one connecting polymer film or one connecting laminate adhesively bonded therebetween. Also arranged between the two glass or polymer panes is an electronic functional element. A cut-out of the connecting polymer film or the connecting laminate is provided in a partial surface area of the laminated glass pane, in which cut-out an electronic functional module is accommodated. The functional module has a thickness that is less than or equal to the thickness of the connecting polymer film or the connecting laminate. The thickness of the functional module is preferably smaller than the thickness of the polymer film or of the film laminate. The functional module comprises or contains the electronic functional element. The functional element is fixed on a separate thin carrier polymer film, in particular with a thickness in the range between 30 and 70 µm, on one of the glass or polymer panes. The carrier film is thus arranged between the functional element and said glass or polymer pane and bonds them to one another. The carrier polymer film is preferably attached directly to said glass or polymer pane, i.e., without interposition of another polymer film.

The functional module comprises at least the functional element and the carrier film. The functional module can include additional elements, in particular conductor structures such as antenna lines or a protective polymer film, as explained below.

The polymer films mentioned, both the connecting polymer film or the films of a connecting laminate for bonding the two panes and the carrier polymer film of the functional module, can, in particular, be PVB films known per se. PVB films (polyvinyl butyral) with such a low thickness as proposed here as a carrier polymer film of the functional module have, however, not previously been used in the technical field. In principle, however, in the context of the invention, the use of films of other polymers is also possible, for example, EVA (ethylene vinyl acetate) or PU (polyurethane).

According to the invention, the laminated glass pane comprises two glass or polymer panes. Soda lime glass, which is common for window panes, is, in particular, suitable for glass panes. Suitable polymers include polycarbonate and polymethyl methacrylate.

In one particular embodiment of the invention, the functional element, together with an antenna and/or conductor structure, which comprises closely adjacent conductor paths, is arranged on the carrier polymer film. The antenna or the conductor structure surrounds the electronic functional element, in particular, at least in some sections. The antenna and/or conductor structure has, in particular, a spiral or polygonal-spiral conductor path that surrounds the functional element or is implemented as such.

Preferably, both the electronic functional element and the antenna and/or conductor structure are arranged completely within the cut-out of the connecting polymer film or the connecting laminate. The connecting polymer film or the connecting laminate do not overlap either the functional element or the antenna and/or conductor structure, as a result of which, in particular, the sensitive antenna and/or conductor structure are protected during production of the laminated glass pane.

In a useful embodiment of this structure, the antenna and/or conductor structure is printed onto the carrier polymer film. For this, a printing process known per se can be used, such as the screen-printing of a conductive paste or the inkjet printing of a conductive ink, with a subsequent thermal processing step used in each case.

In another embodiment, a thin protective polymer film, in particular with a thickness in the range between 30 and 70 μm, is arranged in the cut-out, between the functional element and the other one of the glass or polymer panes. This protective film serves to mitigate the introduction of undesirable forces into the functional module by the glass or polymer pane and appears to be particularly useful with the use of functional modules whose thickness is nearly equal to the space between the panes. The protective polymer film is preferably attached directly to said glass or polymer pane, i.e., without interposition of an additional polymer film.

In the context of the present invention, the term "electronic functional module" is to be understood in a broad sense, which includes a sensor module (for example, a rain or humidity or even a light sensor module), a display module (for example, a head-up display module in the windshield), a communication module (for example, antenna or integrated radio module) as well as combinations of the functional units mentioned with each other or with other functional units not mentioned here. In implementations currently considered significant, the electronic functional module thus includes at least one of the following functional elements; a moisture sensor, a light sensor, a temperature sensor, an antenna, an actuator, an electronic processing or switching unit, an LCD display unit, and an LED display unit. In particular, more than one functional unit from this group can be included.

Currently considered particularly important is an embodiment in which the functional module includes a temperature sensor as a functional element with an antenna surrounding it that has a spiral or polygonal-spiral conductor path.

In embodiments currently considered particularly practicable, the functional element has the shape of a flat prism, in particular a flat cuboid, or a flat circular disk. However, the invention is not restricted to this; but rather can be implemented with electronic functional units that are irregularly shaped as well as with electronic functional units that are not completely enclosed by a housing.

Typically, however, the functional element has a a greater thickness than the surrounding, in particular printed, antenna and/or conductor structure.

In accordance with the established technologies of producing laminated glass panes specifically for road vehicles, in preferred embodiments of the invention, the thickness of the polymer film or of the film laminate and of the electronic functional module is less than 1.2 mm and in particular in the range between 0.6 mm and 1.0 mm. It goes without saying that the invention can also beneficially be used in connection with thicker polymer films or film laminates, in which case the accommodation of multiple functional elements in a single functional module can be simplified in terms of the electrical parameters and the connection and encapsulation technology.

Based on investigations by the inventors, an embodiment in which the carrier polymer film is applied overlapping the connecting polymer film at the edges of the cut-out appears to be advantageous. The overlapping region can, depending on the size of the cut-out in the connecting polymer film, preferably be from 1 mm to 10 mm, for example, between 2 and 3 mm. The same applies to the protective polymer film, if one is present. It also appears useful to maintain a minimum distance between the outermost section of an antenna or other conductor structure of the functional module and the outer perimeter of the cut-out in which it is accommodated. The distance is preferably from 1 mm to 10 mm, in particular from 2 mm to 5 mm. Such a distance prevents the surrounding connecting polymer film from "flowing onto" the conductor structure and thus possible deformation of the latter.

In implementations currently considered particularly significant economically, the laminated glass pane according to the invention is implemented as a windshield or rear window or side window or roof glazing of a vehicle, wherein the cut-out of the polymer film or the film laminate and the prefabricated electronic functional module are arranged at or near an edge of the laminated glass pane. Large-scale use in road vehicles, in particular in passenger cars, should be emphasized here. However, use in other vehicles, such as trains, boats, small aircraft, air taxis, or the like, is also possible. In addition to use of the invention in vehicles, use in building glazing can also be beneficial. When using transparent conductive structures, placement of the electronic functional module far from edges of the laminated glass pane is also possible. This also applies in particular to colored glass and to areas of application outside the automotive industry.

In the aforementioned applications, it is, from the point of view of the inventors, advantageous for the cut-out to have an area proportion of less than 10%, in particular less than 5%, of the area of the laminated glass pane. With such an area proportion, the mechanical stability of the bond formed with the connecting polymer film or the connecting laminate between the two glass or polymer panes can be sufficiently ensured. However, in individual cases, exceeding this area proportion appears not to be critical.

Accordingly, the connection also relates, in principle, to a vehicle, in particular a road vehicle that has at least one laminated glass pane with the structure according to the invention.

Method aspects of the invention are largely evident from the device aspects explained above and are, consequently, not explained again here. It is, however, pointed out that the steps of the method specified in claim 12 as well as its configurations can be modified to the extent specific embodiments of the electronic functional module provided according to the invention make this seem reasonable. It is essential here that the advantages that can be achieved with the mechanical decoupling of the electronic functional element from the intermediate layer of the laminated glass pane are realized by suitable process control.

Specifically, reference is made to an embodiment of the method in which providing the electronic functional module includes providing the carrier polymer film with an antenna and/or conductor structure that includes closely adjacent conductor paths, wherein the antenna or the conductor structure surrounds the electronic functional element, in particular, at least in some sections. Finally, reference is also made to an embodiment currently considered advantageous, wherein the step of placing the electronic functional element with the underlying carrier polymer film on a surface of the first or second glass or polymer pane, a step of covering the electronic functional element with a thin protective polymer film is carried out.

Conventional laminated glass panes are laminated in autoclaves at high pressure. It has been shown that this procedure can damage the functional element and in particular the sensitive surrounding antenna and/or conductor structure. In order to avoid this, the lamination of the composite is preferably carried out at a temperature of less than 120° C., particularly preferably less than 100° C. The lamination is preferably done at a reduced pressure ("under vacuum") in particular over a period of 2 hours to 20 hours. The lamination is preferably carried out without using an autoclave.

Figure 1B:
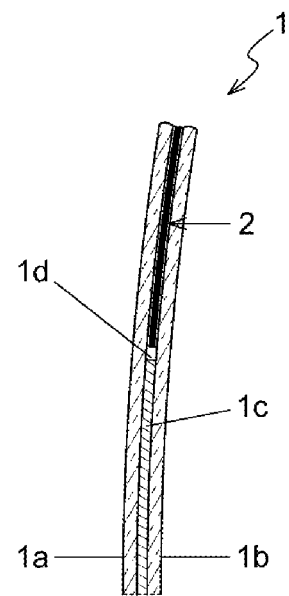
Figure 2A:
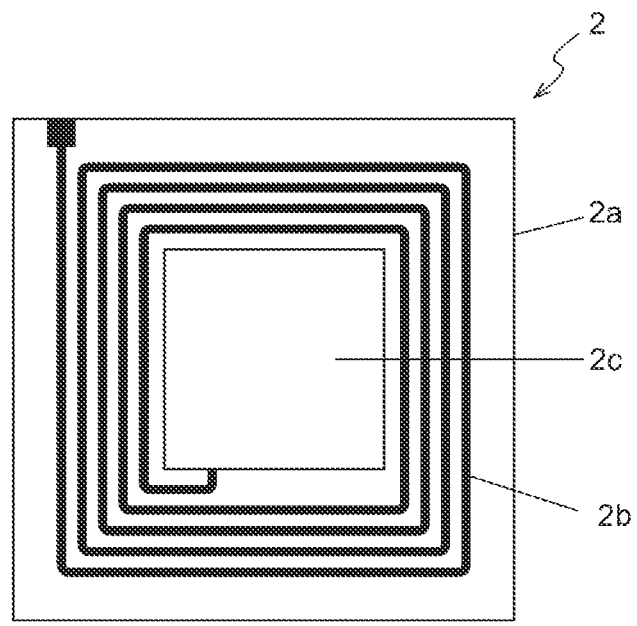
Figure 2B:
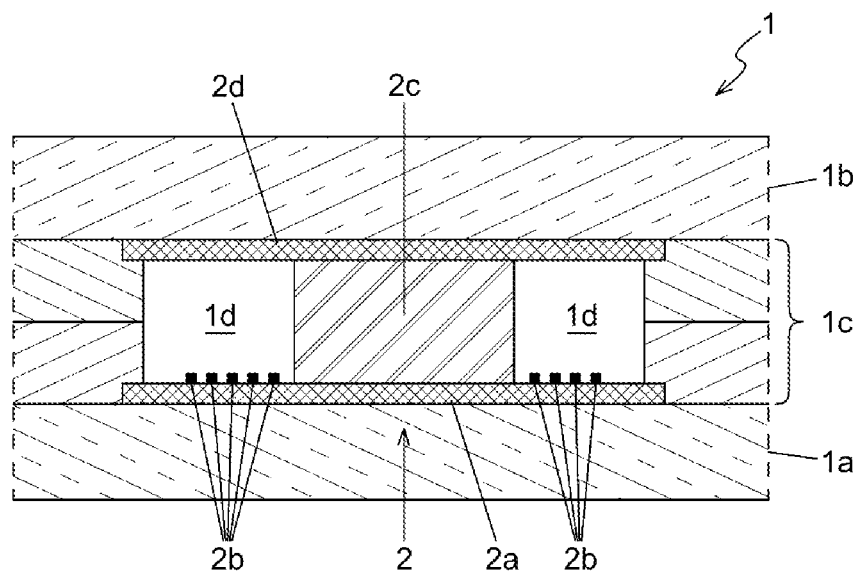
Figure 3:
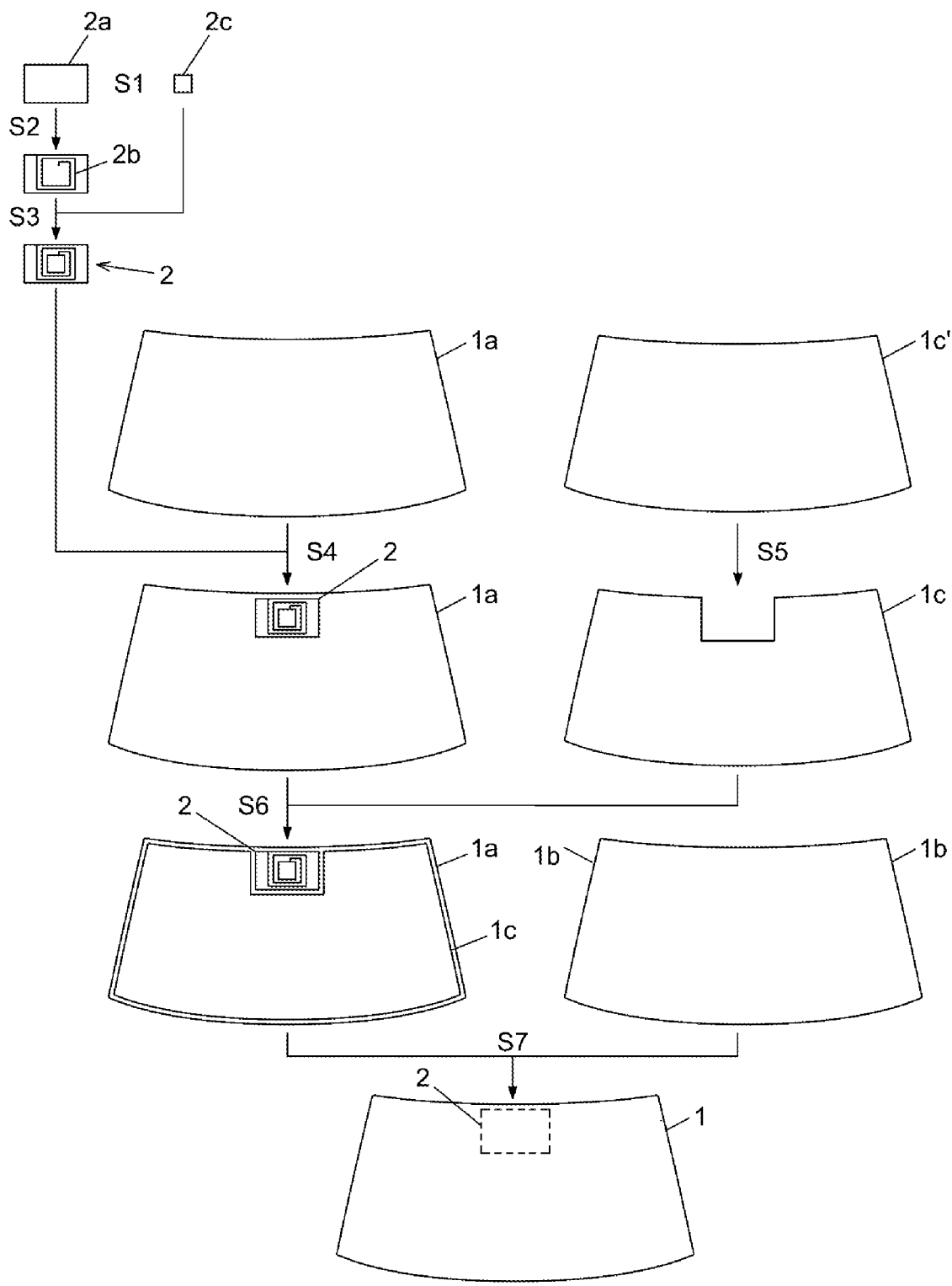

Advantages and practicalities of the invention are also evident from the following description of exemplary embodiments with reference to the figures. They depict:

FIGS. 1a and 1b schematic representations (plan view and sectional view) of an exemplary embodiment of the invention, FIGS. 2a and 2b detailed views (plan view and sectional view) of the arrangement of FIGS. 1a and 1b, and FIG. 3 a schematic representation to explain the method according to the invention.

FIG. 1a schematically depicts a plan view of a laminated glass pane 1 as a passenger car windshield in accordance with an exemplary embodiment of the invention, and FIG. 1b depicts a sectional view of the same, along a sectional plane A-A. The windshield 1 is formed as a laminated glass pane with a first and second glass pane 1a, 1b and a polymer film 1c bonded between the glass panes. In a region near the upper edge of the windshield, a cut-out 1d is provided in the polymer film 1c, in which cut-out an electronic functional module 2 is inserted between the first and second glass pane 1a, 1b.

FIGS. 2a and 2b depict an embodiment of the electronic functional module 2, in which an antenna line 2b running spirally in a square basic shape is printed on a thin carrier polymer film 2a (PVB) with a thickness of approx. 50 µm by means of a printing process in such away that it surrounds a temperature sensor 2c placed in the center on all sides. The conductor path of the antenna line 2b can be formed from a conductive paste or ink by a printing process known per se for these purposes, and the temperature sensor 2c is, in particular, connected to the antenna line by means of conductive adhesive dots.

FIG. 2b shows how this electronic functional module 2 is inserted into the cut-out 1d of the laminated glass pane 1. It can be seen that, here, the connecting film between the first and second glass pane 1a, 1b is a two-layer laminate 1c made of two different PVB films that differ in their physical properties and, as a laminate, provide optimum property compensation as an intermediate layer of the laminated glass pane.

It can further be seen that the thin PVB carrier film 2a of the functional module 2 extends below the connecting laminate 1c on all sides at the edges of the cut-out 1d. The overlapping region can expediently be from 2 to 3 mm. It can also be seen that there is a distance between the outermost section of the antenna line 2b and the perimeter of the cut-out 1d, which distance can usefully be in the range between 2 and 5 mm.

Above the functional module, a thin PVB protective film 2d is arranged on the underside of the second glass pane 1b. Here, this is also implemented to overlap with the connecting laminate 1c, but this is not essential to the invention. Since the protective polymer film 2d serves to protect the temperature sensor 2c, a dimension with which its surfaces, but not the antenna line, are covered would also suffice.

FIG. 3 schematically depicts essential steps in the production of the laminated glass pane depicted in FIG. 1.

In a step S1, a thin PVB carrier film 2a and an electronic functional element 2c (such as the aforementioned temperature sensor) are provided. In a second step, the carrier polymer film 2a is provided with a conductor structure 2b (such as the aforementioned antenna line) by a suitable printing method (e.g., screen printing or inkjet), and in a step S3, the functional unit 2c is applied on the carrier polymer film 2a, fixed there, and electrically connected to the conductor structure. Thus, the electronic functional module 2 is ready to be installed.

Subsequently, in a step S4, the electronic functional module 2 is applied to a predetermined mounting location on a first glass pane 1a provided in advance. Following that, a protective polymer film (not shown) or even a protective elastomer layer can be applied to the functional module.

In a step S5, a PVB connecting film 1c' cut to size externally in advance is provided with a cut-out 1d adapted to the lateral dimensions and the mounting position of the electronic functional module 2, yielding the preconfigured PVB connecting film 1c, as shown in FIG. 1.

In a first step S6 of a so-called "in-line process", the configured PVB connecting film 1c is applied on the first glass pane 1a, and in a subsequent step S7, the second glass pane 1b is placed on top, and the stack is laminated in the usual manner to form the laminated glass panel 1.

In this lamination procedure, the sufficiently sized cut-out 1d in the PVB connecting film 1c, in conjunction with the use of the thin PVB carrier film of the functional module 2 within this cut-out, ensures that flowing of the PVB connecting film does not result in mechanical interference with the functional module and, in particular, with their conductor structure. Their full ability to perform and their unrestricted reliability are thus ensured by the present invention.

Tests

Various tests were performed. The observations made are presented in the following.

The use of a connecting polymer film or a connecting laminate 1c with a thickness that was less than the thickness of the functional module resulted in glass breakage during lamination. This was successfully avoided by using a connecting polymer film or a connecting laminate 1c with a thickness greater than or equal to the thickness of the functional module.

In the case of lamination in an autoclave at 12 bar and 130° C. over a period of one hour, it was observed that the conductor structures are sometimes deformed. This was successfully avoided by carrying out the lamination without an autoclave under vacuum at a temperature of, for example, 90° C. This required longer lamination times of at least 2 hours.

When the cut-out 1d of the connecting polymer film or the connecting laminate 1c was selected so small that it included the functional element but not the conductor structure, it was sometimes observed that the conductor structure was deformed. The inventors attributed this effect to entrapped air. This was successfully avoided by arranging both the functional element and the conductor structure completely within the cut-out 1d.

The use of a protective polymer film 2d resulted in improved aesthetics. In particular, the edges of the carrier polymer film were less clearly visible.

The implementation of the invention is not restricted to the example explained above, but is also possible in a large number of variants that are within the scope of the attached claims.

LIST OF REFERENCE CHARACTERS 1 laminated glass pane
1a, 1b first and second glass pane
1c connecting polymer film (PVB film) or connecting laminate
1c' unconfigured connecting polymer film
1d cut-out in the polymer film
2 electronic functional module
2a carrier polymer film
2b conductor structure (antenna line)
2c functional element (temperature sensor)
2d protective polymer film

The invention claimed is:

1. A laminated glass pane comprising two glass or polymer panes and at least one connecting polymer film or connecting laminate adhesively bonded therebetween,
    wherein a cut-out in the connecting polymer film or in the connecting laminate is provided in a partial surface area of the laminated glass pane, and an electronic functional module that has a thickness smaller than or equal to a thickness of the connecting polymer film or the connecting laminate is accommodated in the cut-out,
    wherein the electronic functional module has an electronic functional element that is fixed on a separate thin carrier polymer film on one of the two glass or polymer panes,
    wherein the electronic functional element is arranged on the carrier polymer film together with an antenna that comprises closely adjacent conductor paths,
    wherein the antenna is printed onto the carrier polymer film,
    wherein the antenna has a spiral or polygonal-spiral conductor path that surrounds the electronic functional element.

2. The laminated glass pane according to claim 1, wherein the electronic functional element and the antenna are arranged completely within the cut-out.

3. The laminated glass pane according to claim 1, wherein the electronic functional element has a greater thickness than the antenna.

4. The laminated glass pane according to claim 1, wherein the carrier polymer film is attached directly to said glass or polymer pane.

5. The laminated glass pane according to claim 1, wherein a thin protective polymer film is arranged in the cut-out between the electronic functional element and another one of the two glass or polymer panes.

6. The laminated glass pane according to claim 5, wherein the thin protective polymer film has a thickness in the range between 30 and 70 µm.

7. The laminated glass pane according to claim 5, wherein the thin protective polymer film is attached directly to the other one of the two glass or polymer panes.

8. The laminated glass pane according to claim 1, wherein the electronic functional element is implemented as a moisture sensor, a light sensor, a temperature sensor, an actuator, an electronic processing or switching unit, an LCD display unit, and/or an LED display unit.

9. The laminated glass pane according to claim 8, wherein the electronic functional element is implemented as a temperature sensor.

10. The laminated glass pane according to claim 1, wherein the thickness of the connecting polymer film or the connecting laminate and the electronic functional module is less than 1.2 mm.

11. The laminated glass pane according to claim 10, wherein the thickness of the connecting polymer film or the connecting laminate and the electronic functional module is in the range between 0.6 mm and 1.0 mm.

12. The laminated glass pane according to claim 1, wherein the carrier polymer film is applied at edges of the cut-out overlapping with the connecting polymer film.

13. The laminated glass pane according to claim 1, wherein the cut-out has an area proportion of less than 10% of an area of the laminated glass pane.

14. The laminated glass pane according to claim 1, wherein the separate thin carrier polymer film has a thickness in the range between 30 and 70 µm.

15. A vehicle comprising at least one laminated glass pane according to claim 1.

16. A method for producing a laminated glass pane according to claim 1, comprising:
    providing a first and second glass or polymer pane,
    providing a connecting polymer film or a connecting laminate for bonding the first and second glass or polymer pane, having a cut-out provided therein,
    providing an electronic functional element on a thin carrier polymer film as an electronic functional module, whose shape matches a shape of the cut-out in the connecting polymer film or the connecting laminate and whose thickness is smaller than a thickness of the connecting polymer film or the connecting laminate, wherein an antenna that comprises closely adjacent conductor paths is printed onto the carrier polymer film, which has a spiral or polygonal-spiral conductor path that surrounds the electronic functional element,
    placing the electronic functional element with the underlying carrier polymer film on a surface of the first or second glass or polymer pane, adhering the connecting polymer film or the connecting laminate on the same surface of the first or second glass or polymer pane, and laminating the composite with the second glass or polymer pane placed thereon to complete the laminated glass pane.

17. The method according to claim 16, wherein after placing the electronic functional element with the underlying carrier polymer film on a surface of the first or second glass or polymer pane and adhering the connecting polymer film or the connecting laminate, the method further comprises covering the electronic functional element with a thin protective polymer film.

18. The method according to claim 16, wherein the laminating of the composite is carried out at a temperature of less than 120° C.

19. The method according to claim 18, wherein the laminating of the composite is carried out at a temperature of less than 100° C.

20. The method according to claim 16, wherein the laminating is done at a reduced pressure over a period of 2 hours to 20 hours without using an autoclave.

\* \* \* \* \*